Jan. 24, 1967  T. SCHWARTZ  3,300,070

VEHICLE FOR HANDLING BULK MATERIALS

Filed Nov. 25, 1964  2 Sheets-Sheet 1

INVENTOR.
THOMAS SCHWARTZ
BY
Frederick A. Zoda
ATTORNEY.

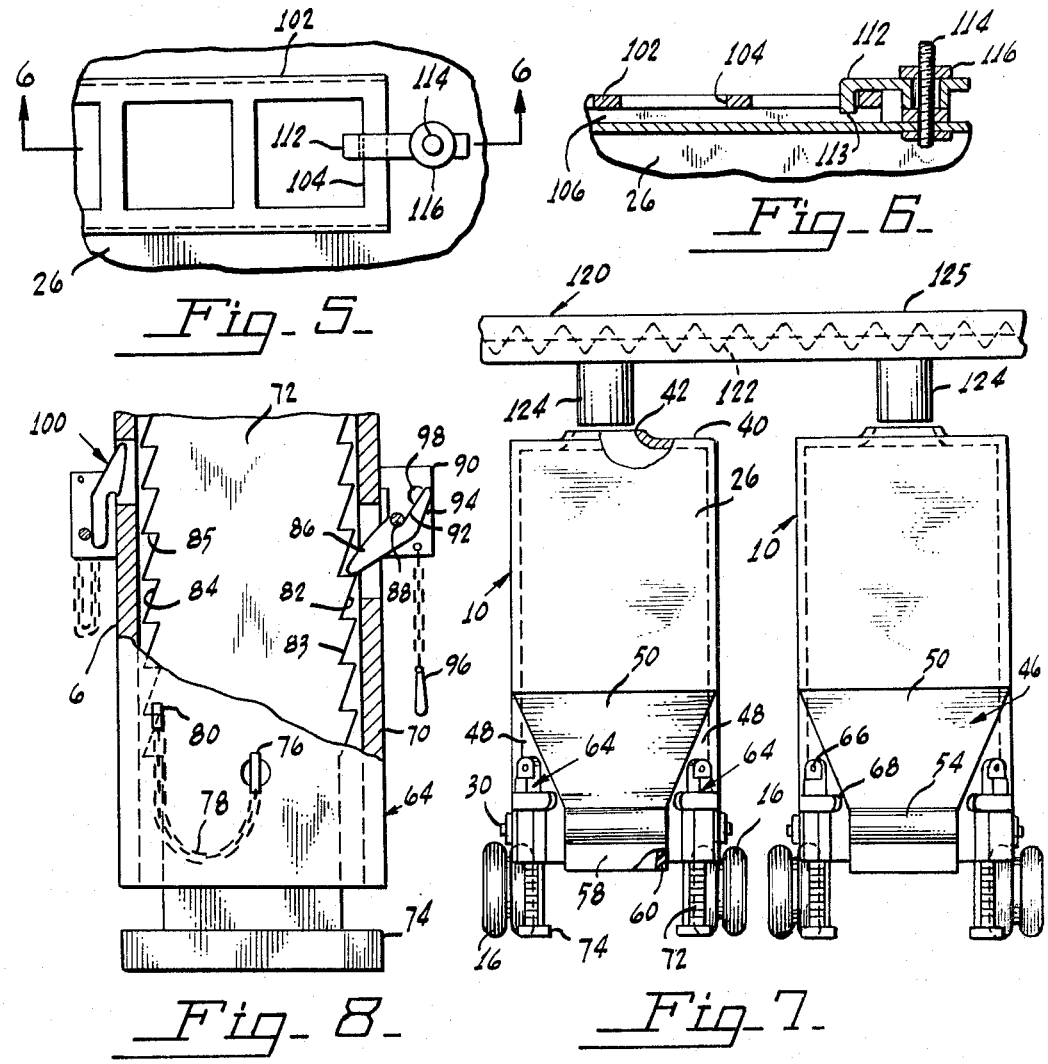
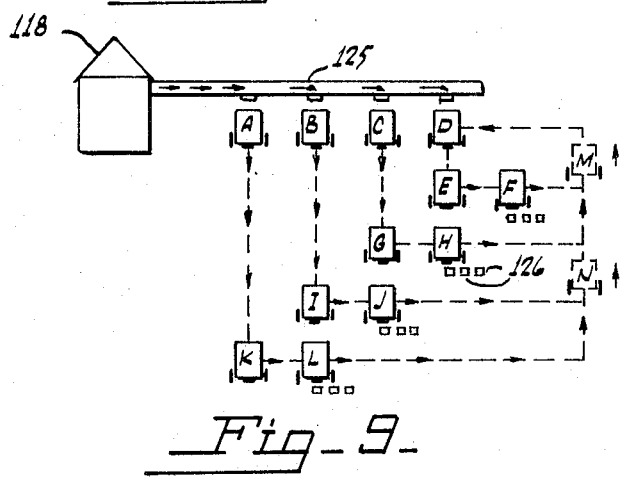

ns
3,300,070
VEHICLE FOR HANDLING BULK MATERIALS
Thomas Schwartz, 69 Bedford Place, Yardley, Pa. 19067
Filed Nov. 25, 1964, Ser. No. 413,878
3 Claims. (Cl. 214—508)

This invention relates, in general, to the production, transport, and packaging of granular or comminuted bulk materials including fertilizers, chemical compounds, grain, dry-mixed cementitious products, and many others.

More specifically, the invention has reference to a system whereby the production, shipment, and packaging of materials of this type will be handled with far more efficiency than has heretofore been the case, thus to produce considerable savings.

The invention, further, relates to a wheeled container particularly designed for use as an important part of said system.

At present, the production, transportation, and ultimate packaging of bulk materials involves a notable lack of efficiency. For example, in the production of bulk fiertilizer mixes the practice, at the point of production of the mix, is to discharge the same into individual drums. These drums, although of substantial size and capacity, are nevertheless difficult to handle, and considerable manual labor is involved in positioning the drums at the discharge point of the mixed fertilizer product. In such instances, the mix is conveyed to discharge spouts, for gravitation therethrough into the drums. As each drum is filled, it must be moved and replaced by an empty drum. The drums are then loaded upon semi-trailers or full trailers, for transport to geographically remote locations. At these locations, the product is emptied from the drums, and is packaged in individual sacks for re-shipment to other locations. The emptied drums, meanwhile, must then be returned to the point of production for reuse.

Attempts have been made to load the product at its source directly into trailers designed to carry bulk materials. However, this requires that the trailer, tractor, and driver remain together during the loading, for the reason that such trailers have a plurality of compartments each of which must be individually filled through its own hatch. This requires that the trailer be moved two or three times during the loading procedure. This necessitates the retention of the tractor and driver on the premises, with the result that heavy demurrage expenses are often involved. Further, material of this type must often be sampled and chemically analyzed, to assure that it is of proper content, chemical strength, and is mixed to proper proportions. Should it be found that the product is lacking in one or more of these essentials, it must be completely unloaded from the drums or from a bulk material trailer, as the case may be, at obviously high cost and with further demurrage expenses.

In view of the problems which have heretofore persisted, and the lack of efficiency in the entire system of production, distribution, and ultimate packaging of bulk materials, it is an important object to the present invention to provide a wheeled container designed for receiving a large quantity of bulk material directly at the point of production, transporting it in bulk to a geographically remote location, discharging the load directly into a conveyor extending to a bagging apparatus, and then returning to the point of production.

Another important object is to provide a container of the type stated which will be particularly designed for loading and unloading bulk materials while in a raised position, so as to facilitate the packing of the material with maximum compression thereof in the interior, and so as to further facilitate the discharge of the material when it is to be conveyed directly from the container to a bagging apparatus or the like.

Another important object is to so design the container that when it is in its up position for loading or discharge of the material, as the case may be, it will have its filling and discharge openings located substantially horizontally, with the container body inclined to facilitate either loading or unloading to the maximum degree.

Another object of importance is to provide a wheeled container of the character described which will be simply designed, and will be capable of being moved either to its tilted loading and unloading position, or to its horizontal running position, with maximum speed and ease.

A further object of importance is to provide a container of the character described which will include extensible legs at the rear end thereof, so designed as to insure that the container will be stably supported, during the loading or unloading of the bulk materials.

A further object of importance is to provide a container of the character described which, while being unloaded, will be particularly designed to be supported without the need of an accompanying tractor and driver. In this way, it is proposed that both at the point of production and at the geographically remote point of unloading and packaging, the containers can serve as temporary storage facilities, while loaded or empty containers are being hauled between said points of production and packaging, to replace containers at said points that have been completely loaded or emptied.

Another object of importance is to provide a system for producing, shipping, and packaging bulk materials that will eliminate the need for expensive storage facilities, the loading and unloading of individual drums, the provision of expensive silos, or other structures or procedures that presently require high capital investments.

Other objects will appear from the following description, the claims appended thereto, and from the annexed drawing, in which like reference characters designate like parts throughout the several views, and wherein:

FIG. 5 is a view similar to FIG. 3 showing the other end portion of the ladder;

FIG. 6 is a sectional view substantially on line 6—6 of FIG. 5;

FIG. 7 is a rear end elevational view showing a plurality of the containers in raised position, in association with a discharge conveyor for loading bulk materials directly into the containers at a point of production of said materials;

FIG. 8 is an enlarged, fragmentary view of one of the extensible supports, the support being shown partly in elevation and partly in longitudinal section; and FIG. 9 is a diagrammatic view illustrating the system in operation.

Figure 1:
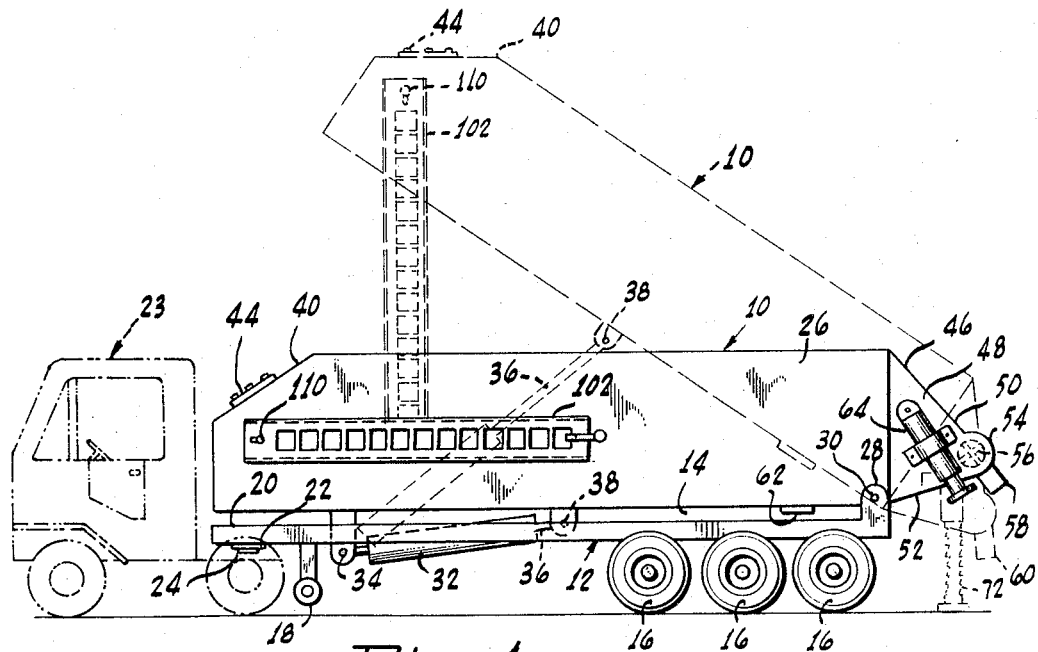
FIG. 1 is a side elevational view of a wheeled container constructed according to the present invention, a tractor being shown in dash-dotted outline, the container being shown in full lines in its lowered running position, and in dash lines in its raised loading and unloading position.
Figure 2:
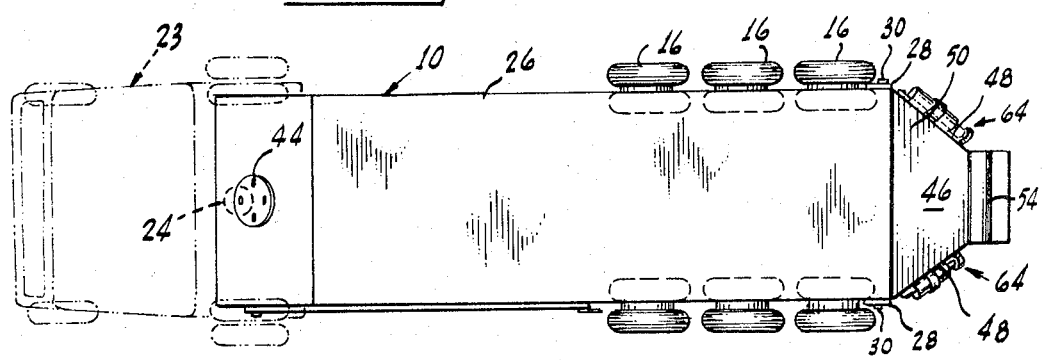
FIG. 2 is a top plan view of the container in a lowered position, the tractor being shown in dash-dotted lines.
Figure 3:
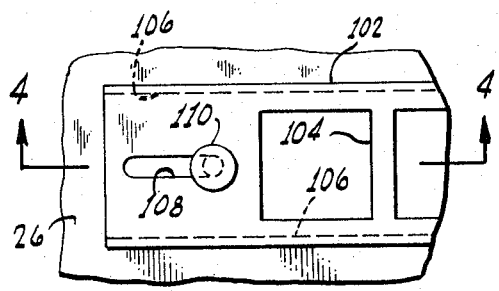
FIG. 3 is an enlarged, fragmentary side elevational view showing one end of a ladder carried by the container.
Figure 4:
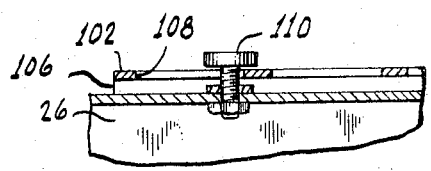
FIG. 4 is a longitudinal sectional view substantially on line 4—4 of FIG. 3.

Referring to the drawing in detail, a wheeled container generally designated 10 includes a chassis generally designated 12. The container chassis is formed with an elongated, horizontal supporting frame 14 supported at the rear end thereof upon running wheels 60. Preferably, I provide 3 sets of dual running wheels in a tandem arrangement, as shown in FIGS. 1 and 2. However, the number and type of running wheels would of course be subject to change, according to the capacity of the particular container.

At the forepart of the frame, I provide landing wheels 8. Forwardly of the landing wheels there is a tongue 20 connectable to a fifth wheel 22 of a conventional tractor generally designated 23. The tongue is provided with the usual pin 24 projecting downwardly toward the fifth wheel to bear in a slot-like opening provided in the fifth wheel.

An elongated, hollow, rectangular body 26 is supported upon a frame through the provision of bearing plates 28. These extend upwardly from the rear end of the frame to receive trunnions 30 carried by the rear end portion of the container body adjacent the underside of the body. In this way, the container body is mounted for swinging movement between a horizontal running position shown in full lines, and a tilted loading and unloading position shown in dash lines in FIG. 1.

A hydraulic cylinder 32 is pivoted at its front end as at 34 on frame 14. A ram 36 working in the cylinder is pivoted at 38 to the underside of the body for raising and lowering the same. Fluid under pressure is supplied from a suitable source on tractor 23. It will be understood, however, that the power source for the hydraulic cylinder can be on the trailer itself.

Referring to FIGS. 1 and 2, at the front end of the container body an inclined top wall portion 40 is centrally formed with a filler opening 42 (see FIG. 7). A hatch 44 normally closes the opening. As shown in FIG. 1, when the container body is to be loaded, the inclined wall portion 40 will be in a horizontal plane to facilitate loading of the body.

On the rear end portion of the body, a rearwardly projecting extension 46 has rearwardly converging side walls 48, a rearwardly declining top wall 50, and a rearwardly inclined bottom wall 52. This defines a funnel-like discharge hopper on the rear end of the container body. At the smaller, rear end of the hopper, there is a transversely disposed, partly cylindrical extension 54 in which is mounted a conventional, power-driven, bladed, rotary feeder 56. Materials pass through the feeder in a metered, controlled flow and on through a metal duct to which is connected a transversely disposed, rubber discharge spout or sleeve 58 having at its lower end a discharge opening 60. The sleeve would be designed to fit over the inlet to a conveyor extending to a bagging apparatus or the like. Adjacent the rear end of the container body, there is a conventional power-driven vibrator 62, to insure that the bulk materials will be kept from bridging or packing in such a way as not to move continuously toward the discharge spout.

In some instances, the container may be designed to discharge into a receiving helical conveyor (not shown) of a type which will convey materials deposited therein only at a predetermined rate. In this event, the rotary feeder might be omitted and in its place, a manually operated, conventional sliding gate can be used to control the discharge of the container contents.

Mounted upon the side walls 48 are extensible supports 64. When the container is lowered, these are tilted from the vertical (FIG. 1). However, when the container is raised, the supports are in vertical planes, that is, they are normal to the wall portion 40.

The supports are normally retracted, but are designed to extend into contact with the ground when the container is raised. In this way, assurance is provided against the container up-ending while being loaded or unloaded.

The supports are secured fixedly to the side walls 48, as for example by means of studs 66 passing through flat extensions on the upper ends of the supports, with the mounting of the supports being further assured through the provision of retaining straps 68.

The supports are designed to extend automatically, when the container is in tilted position. Thus, each support includes a housing 70 which in the illustrated embodiment is of rectangular cross section. Housing 70 is formed open at its lower end, receiving an extension leg 72 the lower end of which projects out of the housing and is provided with a supporting foot 74.

Normally, when the leg 72 is fully retracted in the housing, a locking pin 76 is used to prevent its accidental extension from the housing. The pin passes through registering openings of the housing 70 and leg 72. Pin 76 can be carried by a chain 78 suspended from an eye 80 provided upon the housing.

Along one side of leg 72, I provide a series of ratchet teeth 82, having end walls 83 facing upwardly and disposed normally to the length of the leg. Along the opposite side of the leg I provide ratchet teeth 84 which have end walls 85 faced downwardly, normally to the length of the leg. Each of the series of ratchet teeth 82, 84 has a pawl assembly. Thus, the series of teeth 82 has in association therewith a pawl 86 pivoted on a pin 88 carried by ears 90 between which the pawl is disposed, said ears being fixedly secured to and projecting outwardly from the housing. A torsion spring 92 has a loop that receives pin 88. The spring has legs tensioned to spring away from each other, one of the legs being in engagement with the wall of the housing. The other leg is in engagement with a finger or extension 94 of the pawl. Thus, the pawl is biased at its operating or lower end into a position where it will engage an end wall 83, thus to prevent the leg 72 from moving upwardly within the housing, while still being free to move downwardly therein.

The pawl 86 can be releasably locked in a withdrawn position where it will not engage any of the teeth 82. To this end, I provide a latching pin 96 carried by a chain on one of the ears 90 and adapted to be inserted into an opening 98 with the pawl in retracted position.

In association with the series of teeth 84, I provide a similar but oppositely disposed pawl assembly generally designated 100. When the pawl 86 is engaged or is in operating position as shown in FIG. 8, the pawl assembly 100 is retracted and latched in place by means of a pin similar to the pin 96.

In these circumstances, the leg 72 will be free to automatically drop to the ground. Thus, as the load is lessened, as for example during discharge of the load through the rubber spout 58, the usual spring suspension of the chassis will expand, tending to move the container body upwardly. While this is happening, the support will automatically extend as necessary to insure that the foot will be kept in contact with the ground. There is always a contact with the ground surface, in these circumstances, and the support will always constitute means that will prevent the container from tilting upwardly or up-ending during the unloading operation.

In these circumstances, the pawl assembly 100 is latched in a retracted position.

Assuming now that the opposite condition prevails, that is, the container is being loaded in its tilted position, the first step would be to release the pin 76, in the same manner as when the container is to be unloaded. Leg 72 will drop down into contact with the ground surface. It will be understood that at this time, the pawl 86 is left in its retracted position, and the pawl 100 will now be moved to its operating position.

As the container is loaded, it tends to move to the ground due to compression or flattening of the springs of the chassis. Under these circumstances, the pawl 100 will ratchet over the teeth 84, that is, the supports will automatically shorten as the container is loaded.

Subsequently, when the container is fully loaded and is returned to a horizontal position for transportation, the legs 72 are retracted, and are locked in retracted position by reinsertion of the pins 76.

During loading or unloading operations, it is sometimes necessary to check the proper location of the filler opening in respect to a spout immediately thereabove. Accordingly, I provide a ladder 102 which is carried by the container.

Normally, the ladder extends horizontally as shown in full lines in FIG. 1, longitudinally of the container body. Referring to FIGS. 3–6, the ladder comprises a single piece of metal plate material, having rectangular openings over substantially its full length to define rungs 104. To rigidify the ladder I provide longitudinal, integral flanges 106 extending the full length thereof on opposite sides of the ladder.

At the head or upper end of the ladder, medially between the opposite sides thereof, there is a longitudinal, closed slot 108 receiving a headed stud or pivot pin 110 projecting outwardly from the container body.

At the other end of the ladder there is a means to normally lock the same securely against the container body while the container is being moved from place to place. To this end there is a locking arm 112 having at one end a lip 113 engaging the endmost rung 104. The arm 112 pivots upon the stud 114, and threadedly engaged with the stud is a locking wheel 116.

In use, the wheel 116 is normally threaded against the arm 112 to hold the same lockably engaged with the ladder. However, if the ladder is to be freed at its rear end to move to the vertical position shown in dash lines in FIG. 1, one merely backs off the wheel, sufficiently to permit the lip 113 to be disengaged from the rung 104. The arm now is free to swing out of engagement with the ladder.

The result is that when the container is raised to a loading or unloading position, the rear end of the ladder will swing downwardly, and ultimately, the ladder will reach a position in which it is almost at full verticality. At this time, the user may lift the ladder slightly, the slot 108 permitting this, to allow the bottom end of the ladder to move into engagement with the frame with the ladder now in full vertical position. The ladder will now be available for use while the container is being loaded or unloaded.

In use, the hydraulic cylinder 32 as noted above can be provided with fluid under pressure from the tractor. It may also be provided with pressure fluid from a source located in a loading or unloading yard. This would permit the container to be raised or lowered regardless of the presence or absence of the tractor. In any event, when the ram 36 is extended, the container will move upwardly to a prescribed angle, as for example an angle of about 45 degrees. In these circumstances, the extensible supports will be vertically positioned, and the plane of the filler opening will be horizontal. Also, the spout 58 will be vertically positioned.

This allows the container to be unloaded or loaded and it is not essential that the tractor be kept on the premises. Instead, a plurality of the containers can be disposed side-by-side, during the loading of the same (see FIG. 7), in position to receive bulk materials through their filler openings, said materials gravitating from spouts 124 of a conveyor 120 having the usual helical feed element 122 rotating in a housing 125. The housing extends directly from the production source of the bulk material.

In an arrangement of this type, the conveyor would generally tend to carry materials to the right hand container shown in FIG. 7. This would fill first, and when it is filled, the container next adjacent the same would begin to fill and so on down the line in the direction of the feeding end of the conveyor. When a particular container has been filled, it can be removed, and an empty container would replace the same while other containers are being filled. This would be done by closing the particular discharge spout 124, while the filled container is being moved away and an empty container is being placed in position below the spout.

I propose, in this regard, that at the location in which containers are being filled or unloaded, there would be suitable industrial trucks, not shown, having the usual vertically shiftable lift mechanism. On the lifting mechanism, I would provide a construction similar to the fifth wheel 22 of a conventional tractor, and this wheel would receive the pin 24 projecting downwardly from the tongue 20. In this way, the industrial truck could hitch onto one of the containers, as for example, a container which has just been filled. Then, the container could be moved to another location in the yard where it would await its being connected to a tractor for transportation to a geographically remote location.

In FIG. 9 I have diagrammatically illustrated a system making use of the wheeled containers hereinbefore described. Let it be assumed that containers marked A, B, C, and D are at the point of production of the bulk materials. It will further be assumed that containers E, F, are at one location geographically remote from the point of production. Containers G, H, are at another location geographically remote from the point of production, containers I and J at still another location, and containers K and L at still another location. These locations might all be in different cities perhaps hundreds of miles apart.

Heretofore, at the point of production, the bulk material has been loaded in drums, and then transported to the various geographically remote locations described. At these locations, the material has heretofore been unloaded from the drums and stored, if it cannot immediately be packaged in bags or in similar relatively small containers 126 destined for the ultimate consumer.

This has been a relatively wasteful and inefficient procedure. For example, should drums be available at the point of production, the material would have to be stored at that point. Further, if the material could not immediaely be used at its destination, again the material would have to be stored, as for example in silos or the like.

In accordance with the system constituting the invention, however, there can be containers at the point of production, at the destination, and in movement in both directions between these points at all times. Thus, assume that containers A, B, C, and D are being loaded. When a container is loaded, it could move to any of various destinations at which it is to release the material for packaging in individual sacks 126. At each of these locations, one or more containers would be in a discharge operation, releasing the material directly to a conveyor that extends to or is a part of a bagging apparatus or the like. These would be the containers F, H, J, and L located at four geographical remote locations, that is, locations that are remote not only from one another, but also from the point of production. At each of these locations, a filled container E, G, I, and K is in a stand-by condition. As containers F, H, J, and L are emptied, they are moved to another location in the yard awaiting their return to the point of production. They are hitched to tractors for this purpose, and are then returned as shown at M, N to the point of production for refilling, that is, to replace containers A, B, C, D which have already been filled and are ready to move to the bagging or distribution locations.

This completely eliminates the need of any storage facilities, either at the source of the product or at its destination. It further eliminates the necessity of packing the material in drums or the like and subsequently emptying the drums into bulk storage facilities prior to packaging for the ultimate consumer. In this way, demurrage is completely eliminated, and tractors are not held with their drivers at any location. Rather, there will always be filled or empty containers, as the case may be, ready for movement to or from the point of production, without interfering either with production, loading, movement, or unloading of any other containers.

Such an arrangement obviously has great possibilities in connection with the production, shipment, and packaging of bulk material in many fields.

Ready-mixed dry concrete products can be shipped, for example, in compact, efficient, bulk loads and packaged close to the sales or distribution points thereof. Other products can also, of course, be handled in this manner including various grains, phenolic molding compounds used in large quantities, etc. Heretofore, such compounds have been shipped in drums to the users. Some users of phenolic compounds make use of the same in great quantities, however. The invention permits the compounds, in these circumstances, to be shipped in bulk in one of the containers, and left on the premises of the customers until the container is completely exhausted. In such instances, the compound can be discharged from the container at the customer's plant directly into a conveyor, that would carry the same to hoppers or the like located in feeding position above the presses in which the molded plastic products are formed.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any changes in construction that may be permitted within the scope of the appended claims.

I claim:

1. A wheeled container of the trailer type for transporting comminuted materials in bulk form, comprising:
   (a) a wheeled chassis including a forepart adapted for connection to a tractor;
   (b) a closed container body extending longitudinally of and supported upon the chassis, said body having a rear end portion provided with a discharge opening and a front end portion provided with a filler opening, said body being pivoted on the chassis for movement between raised and lowered positions and in its raised position having its filler and discharge openings in the area of its uppermost and lowermost portions, respectively;
   (c) extensible supports mounted on the body rearwardly of the pivot axis thereof, each support including a downwardly opening housing affixed to the body, a leg slidably telescoping in the body for movement into and out of engagement with the ground and having spaced rows of ratchet teeth one of which has abutments facing upwardly and the other of which has abutments facing downwardly, pawl assemblies on the housing normally biased into engagement with said abutments, and means for locking each of said assemblies in retracted position independently of the other for limiting the leg against ratchetting movement in a selected direction; and
   (d) means connected between the container body and chassis for moving the body between said positions thereof.

2. A wheeled container of the trailer type for transporting comminuted materials in bulk form, comprising:
   (a) a wheeled chassis including a forepart adapted for connection to a tractor;
   (b) a closed container body extending longitudinally of and supported upon the chassis, said body having a rear end portion provided with a discharge opening and a front end portion having a filler opening, the body including a top wall the front end of which has an inclined surface in which said filler opening is formed, said body being pivoted on the chassis for movement between raised and lowered positions, said surface lying in a substantially horizontal plane as the highest part of the body in the raised position thereof;
   (c) extensible supports mounted on the body rearwardly from its pivot axis and operable to extend downwardly into contact with the ground surface in the raised position of the container body; and
   (d) means connected between the container body and chassis for moving the body between said positions thereof.

3. A wheeled container of the trailer type for transporting comminuted materials in bulk form, comprising:
   (a) a wheeled chassis including a forepart adapted for connection to a tractor;
   (b) a closed container body extending longitudinally of and supported upon the chassis, said body having a rear end portion provided with a discharge opening and a front end portion provided with a filler opening, said body being pivoted on the chassis for movement between raised and lowered positions and in its raised position having its filler and discharge openings in the area of its uppermost and lowermost portions, respectively;
   (c) extensible supports mounted on the body rearwardly from its pivot axis and operable to extend downwardly into contact with the ground surface in the raised position of the container body;
   (d) a ladder having a sliding pivotal connection at one end to the forward portion of the body, said ladder swinging gravitationally about its connection responsive to raising of the body from a normal inoperative position to a position in which the ladder extends downwardly from its connection toward the chassis, said sliding connection affording limited upward movement of the ladder in its downwardly extended position to clear the chassis and dispose the ladder in a fully vertical position;
   (e) means on the body releasably engaging the ladder in said normal inoperative position thereof; and
   (f) means connected between the chassis and body for moving the body between said positions thereof.

References Cited by the Examiner

UNITED STATES PATENTS

| 1,359,044 | 11/1920 | Farrington | 254—86 |
| 1,465,665 | 8/1923 | Grindle | 214—508 |
| 2,217,871 | 10/1940 | Lindgren. | |
| 2,606,676 | 8/1952 | Dempster | 214—515 |
| 3,155,248 | 11/1964 | Haller | 214—501 X |
| 3,208,616 | 9/1965 | Haskins | 214—508 |

FOREIGN PATENTS

| 1,101,986 | 3/1961 | Germany. |

GERALD M. FORLENZA, *Primary Examiner.*

ALBERT J. MAKAY, *Examiner.*